United States Patent [19]

Goldman

[11] Patent Number: 4,689,477

[45] Date of Patent: Aug. 25, 1987

[54] VERIFICATION SYSTEM FOR DOCUMENT SUBSTANCE AND CONTENT

[75] Inventor: Robert N. Goldman, Kailua, Hi.

[73] Assignee: Light Signatures, Inc., Los Angeles, Calif.

[21] Appl. No.: 782,782

[22] Filed: Oct. 2, 1985

Related U.S. Application Data

[60] Division of Ser. No. 687,708, Dec. 31, 1984, Pat. No. 4,568,936, which is a continuation-in-part of Ser. No. 657,849, Oct. 4, 1984, Pat. No. 4,656,473, which is a continuation-in-part of Ser. No. 503,392, Jun. 10, 1983, Pat. No. 4,476,468, which is a continuation-in-part of Ser. No. 276,282, Jun. 22, 1981, Pat. No. 4,423,415, which is a continuation-in-part of Ser. No. 161,838, Jun. 23, 1980, abandoned.

[51] Int. Cl.⁴ .............................................. G06K 5/00
[52] U.S. Cl. .................................... 235/380; 235/381
[58] Field of Search ................................. 235/380, 381

*Primary Examiner*—Harold I. Pitts
*Attorney, Agent, or Firm*—Nilsson, Robbins, Dalgarn, Berliner, Carson & Wurst

[57] ABSTRACT

An authenticator device, e.g. card, of verifiable composition substance and informational content with a system of production and verification. Character uniqueness signals identifying the composition of the device are recorded on the card in an encrypted form combined with statistical data signals representative of information on the card. Testing the card involves freshly sensing the character uniqueness data and entering the statistical data. Such fresh data is then compared with the recorded values after decoding. Favorable comparisons manifest approval and enter the statistical data for processing.

17 Claims, 6 Drawing Figures

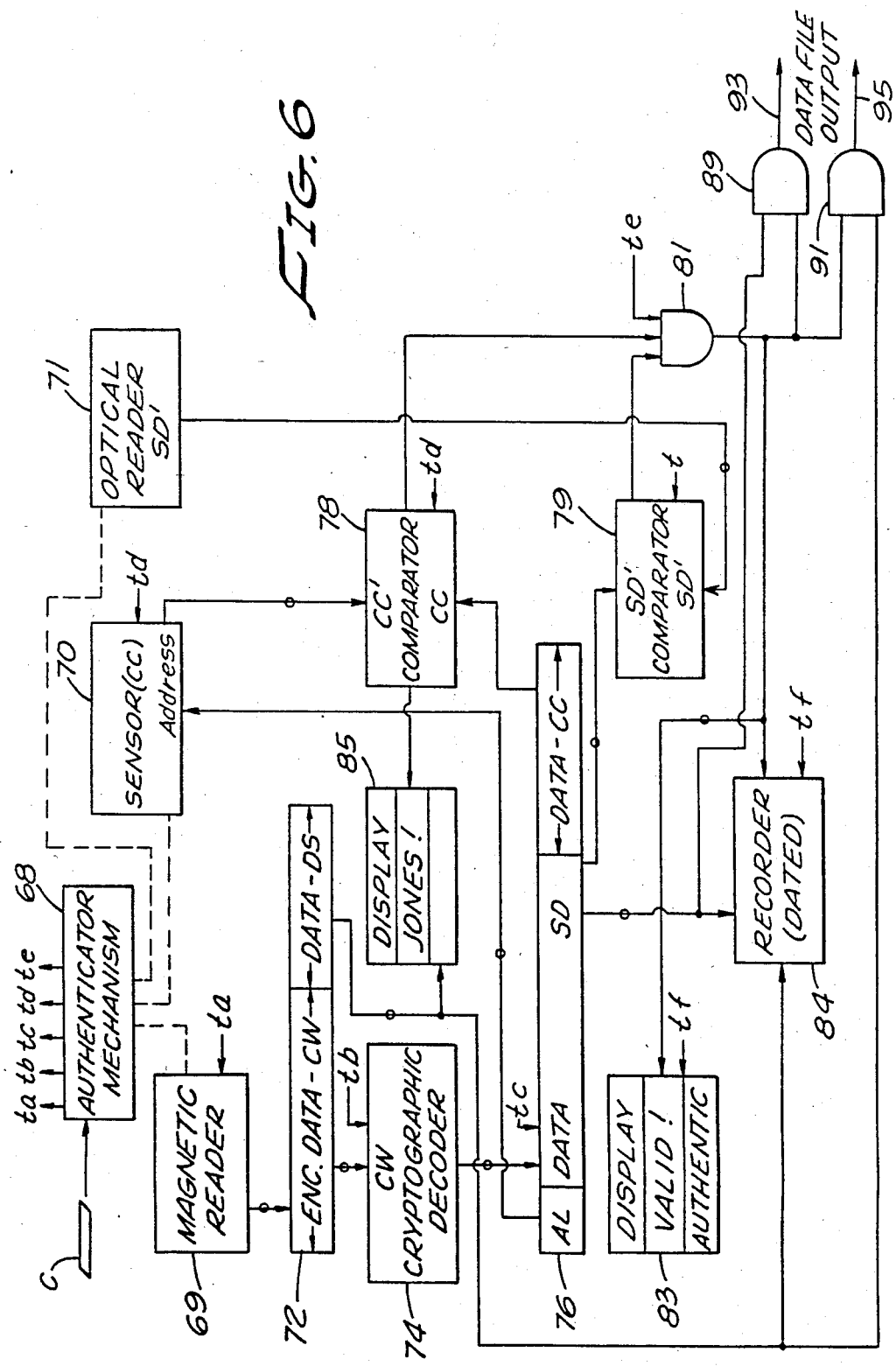

VERIFICATION SYSTEM FOR DOCUMENT SUBSTANCE AND CONTENT

RELATED SUBJECT MATTER

This is a division of application Ser. No. 687,708 filed Dec. 31, 1984, now U.S. Pat. No. 456,893 which is a continuation-in-part of U.S. Pat. application Ser. No. 657,849, Oct. 4, 1984, now U.S. Pat. No. 4,656,473 which is a continuation-in-part of Ser. No. 503,392, June 10, 1983, U.S. Pat. No. 4,476,468 which is a continuation-in-part of Ser. No. 276,282, June 22, 1981, U.S. Pat. No. 4,423,415 which is a continuation-in-part of application Ser. No. 161,838, June 23, 1980, now abandoned.

BACKGROUND AND SUMMARY OF THE INVENTION

A growing need exists for practical systems of identification for use in various specific applications to detect improper documents. One aspect of the problem involves authenticating as genuine, documents in a wide variety of different forms as identification cards, financial cards, including debit and credit cards, certificates of title, documents of ownership, labels and so on. Another aspect of the problem involves the detection of documents that are genuine, but have been modified with regard to critical data. Thus, the effective authentication or verification of many forms of documents requires that they be verified both as to substance and content. Accordingly, a need exists for an improved, economical, and effective document system for meeting that continuing need.

Many forms of documents are used to provide data of financial, commercial, or legal significance. For example, stock certificates and other forms of financial paper constitute a record of ownership but also carry considerable critical data regarding that ownership. A stock certificate might designate a specific individual as the owner of a spcific number of shares in a specific company and relate such data to a specific certificate number. Of course, such information is critically important when the certificate is used to support any of a variety of transactions. In that regard, as suggested above, before transactions are based on a document, it should be authenticated as: (1) genuine and (2) bearing unmodified critical information.

In general, the importance of authenticating documents has necessitated considerable manual involvement in transactions involving such documents. Accordingly, a need exists for an improved, effective and economical system whereby documents can be sensed for data to be processed (as by machine reading) and confirmed as being authentic both with regard to the basic material substance of the document and its informational content.

Various techniques have been proposed for authenticating the substance, e.g. paper of a document as genuine. Techniques have also been proposed for supplementing such authentication techniques by involving other data, e.g. account numbers. However, such techniques have not generally sought to verify or authenticate such data. In that regard, the system of the present invention integrates data serving to verify the document substance with critical document content data to authenticate a document as genuine and unmodified with regard to information provided.

In general, the system of the present invention involves a specific structural format for unique documents which are capable of individual verification both with respect to composition genuineness and informational content. In accordance with the disclosed embodiment, the document takes the form of a sheet of medium having a unique anti-counterfeit characteristic which may be machine sensed. That characteristic provides uniqueness data. The document carries statistical data relating to the essential elements of the document, e.g. financial, legal, and so on, at least a portion of which is deemed critical. The document also carries an integral combination of the uniqueness data and the statistical data. In accordance with the disclosed embodiment, the combination data may be encrypted for subsequent decoding to enable comparisons of both uniqueness data and statistical data to verify the document and its content as genuine.

The present invention also embraces a processor for the documents or authenticator devices including structure for sensing the unique anti-counterfeit characteristic data along with certain statistical data, combining and recording the results. A test process in accordance with the invention senses combined data, decodes such data and performs comparisons with freshly sensed uniqueness and statistical data. Depending upon the results of the comparison, the system may manifest that the document is authentic with regard to substance and content.

As disclosed in detail below, the system hereof may be variously implemented using different media, document compositions, and techniques. For example, a variety of mediums might be employed having substantially unique characteristics for verification. Also, any of a variety of specific component structures may be employed in the system for producing and authenticating documents in accordance herewith.

BRIEF DESCRIPTION OF THE DRAWINGS

In the drawings, which constitute a part of this specification, exemplary embodiments of the invention are set forth as follows:

FIG. 6 is a block diagram of a document authentication system in accordance with the present invention.

Description of Illustrative Embodiment

As indicated above, a detailed illustrative embodiment of the present invention is disclosed herein. However, document media, data formats, and operating systems structured in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
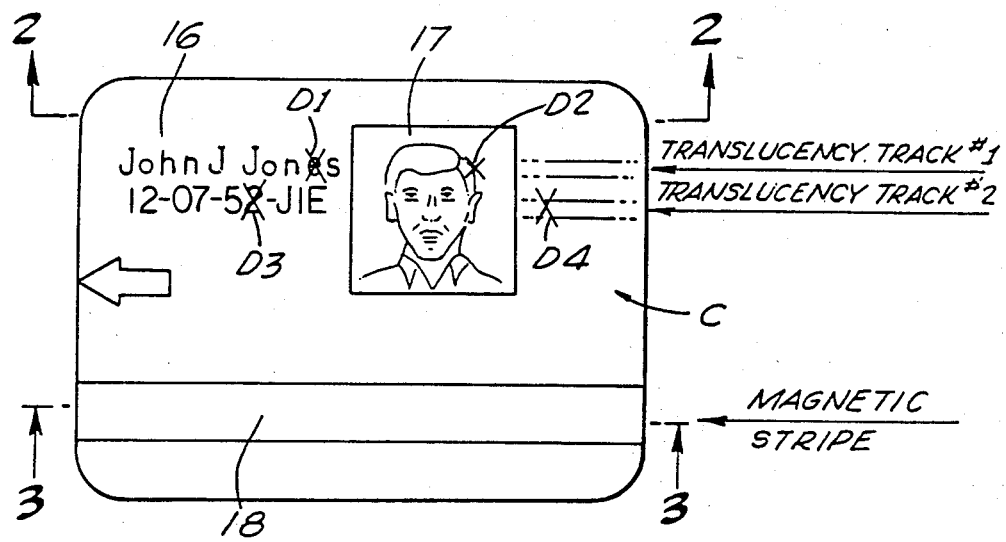
FIG. 1 is a plan view of an identification card document constructed for use with, and implemented in accordance with the present invention.

Referring initially to FIG. 1, an illustrative document is represented in the form of an identification card for a specific individual. The card C is a laminate article incorporating a basic sheet, e.g. a bond paper sheet 15 (see FIGS. 2 and 3) along with certain other media functional in verification operations as explained in detail below.

The format of the card C accommodates personal identification for authorization and may, for example, be embodied as a driver's license. Of course, aspects as disclosed herein may be readily adopted for use in a wide variety of documents as indicated above including passports, valuable paper, financial cards, and so on.

Figure 3:
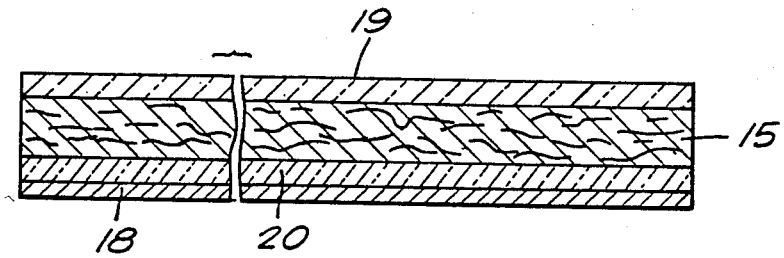

In the illustrative form, the card C carries print 16 (upper left) indicating the name of the assigned holder along with a photographic likeness 17 (right). The print 16 and the likeness 17 may be variously deposited on the sheet of bond paper 15 (FIG. 3).

The genuineness of the card C is manifest by an individual characteristic of the card. Specifically, the card C is unique by reason of the opacity pattern of the paper sheet 15. Such an individual uniqueness characteristic may be utilized to provide signals for registration and comparison with similar data from subsequent observations. Exemplary detailed formats and structures for such sensing and comparison of a uniqueness characteristic are disclosed in U.S. Pat. No. 4,423,415, NON-COUNTERFEITABLE DOCUMENT SYSTEM. In relation to the present invention, it is important to appreciate that the card C embodies a substantially unique, machine-readable, anti-counterfeit characteristic. In the disclosed embodiment, the uniqueness characteristic involves the document content in different ways. That is, the print 16 and the likeness 17 alter the opacity or translucency of the bond paper sheet 15 in certain specific areas. Consequently, overlays, erasures, or other modifications of the print 16 or the likeness 17 will tend to alter the translucency of the paper sheet 15 at the points of alternation. Accordingly, a preliminary safeguard is provided with respect to changes of the statistical data represented by the print 16 and the likeness 17.

In addition to the print 16 and the likeness 17, the card also carries data recorded on a magnetic stripe 18 which is affixed to the card in a conventional fashion. The magnetic stripe 18 records: clock signals, any of a variety of statistical data, and encrypted composite data for verifying the authenticity of the card C both with regard to substance and content. Specifically, character uniqueness data (indicating a genuine card C and not a counterfeit) is combined with critical statistical data to provide composite data which is encrypted and recorded on the magnetic stripe 18. That encrypted data is subsequently sensed, decoded, and separately compared with freshly sensed, similar data to manifest: (1) that the card C is the genuine article, and (2) that the critical statistical data on the card has not been modified. Such verification establishes the credibility of the critical data to a level where it may be used for reliable direct input to a machine processor.

Pursuing an exemplary format of a card C as a driver's license, the document is often used for ancillary identification. For example, a driver's license often is used to confirm that a person has attained maturity, and accordingly, may legally enter into various transactions. In that regard, the print 16 states the assigned holder's name, "John J. Jones", his birthdate, "12-07-52", and an additional element of arbitrary statistical data, "J16". In accordance herewith, the critical data comprising the birthdate in the form of printed intelligence is verified to be unaltered on the basis of two separate and distinct tests.

One test to verify that the birthdate has not been modified is involved with the uniqueness characteristic of the card C. In that regard, data locations D1, D2, D3, and D4 (FIG. 1, each indicated by an "X") are designated as the test locations at which the translucency of the card is machine sensed to provide a unique anti-counterfeit characteristic. The location D3 superimposes the critical data of the birthdate to monitor that location. A second test involves data which is merged with uniqueness data then encrypted to a complex form. Such data is tested with freshly sensed data after being decoded and segregated.

Figure 2:
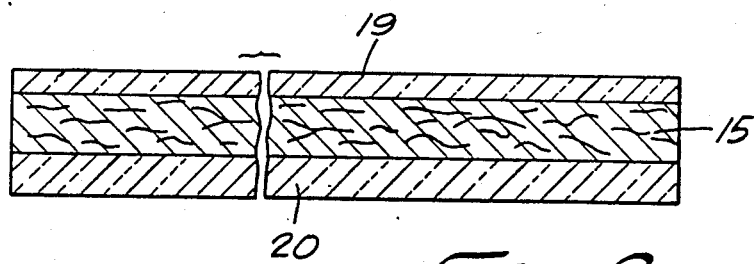
FIGS. 2 and 3 are sectional views taken through the document of FIG. 1, respectively along the lines 2—2 and 3—3.

In view of the above preliminary explanation of functional aspects of the card, consider now its composition details by referring somewhat simultaneously to FIGS. 1, 2, and 3.

The paper sheet 15 in the card C has a reliably repeatable, machine-readable characteristic, e.g. variation in opacity. To observe an example of such a uniqueness characteristic it is simply necessary to hold a sheet of bond paper before a light source and notice the considerable variation in the opacity pattern. That characteristic has been recognized as an effective basis for anti-counterfeit uniqueness data as disclosed in detail in the above-referenced U.S. Pat. No. 4,423,415.

The paper 15 comprises the core of the card C and extends over the full area of the card. While bond paper has been determined to possess an effective uniqueness characteristic, various other materials and structures have also been recognized to possess the requisite characteristic.

The full area of the card C is also occupied by a pair of external, clear plastic sheet laminates 19 and 20. In addition to sealing the paper sheet 15, the laminate 20 also carries the magnetic stripe 18 as shown. In general, techniques for the production of laminate identification cards incorporating printed material and magnetic stripes are very well known in the art.

At this juncture, identification of specific data elements and the similarly identified representative signals will be helpful. Accordingly, the following designations are used herein:

| | | |
|---|---|---|
| CS | | clock pulses for timing operations recorded on the stripe 18 |
| CW | | Encrypted data recorded on the magnetic stripe 18 and decodable to provide the following: |
| | AL | Location of character uniqueness data, designating locations D1, D2, D3, and D4 (FIG. 1) |
| | CC | Uniqueness character data, sensed from locations D1, D2, D3, and D4 (FIG. 1) |
| | SD | Critical statistical data, representing the birthdate of printing 16 (FIG. 1) |
| CC' | | Freshly sensed uniqueness character data sensed from locations D1, D2, D3, and D4 |
| SD' | | Freshly sensed critical statistical data representing the birthdate of printing 16 (FIG. 1) |
| DS | | Miscellaneous statistical data, generally not of a critical nature |

| | |
|---|---|
| ta–tx | Timing signals defining specific operating states |

Figure 4:
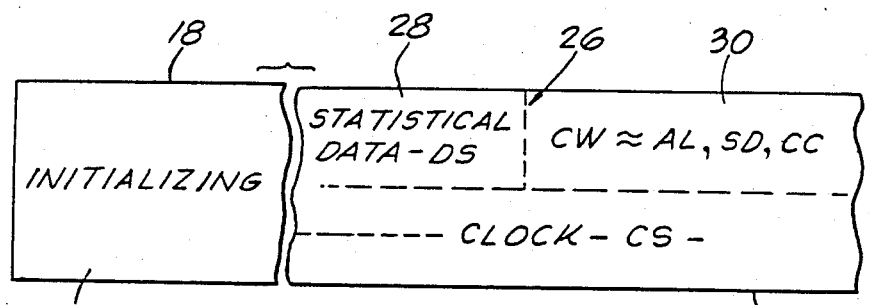
FIG. 4 is a fragmentary diagrammatic view of an exemplary recording format on the card of FIG. 1.

Referring now to FIG. 4, a fragment of the magnetic stripe 18 is represented. The first section 22 (left) of the magnetic stripe 18 carries data to initialize the sensing operation by a magnetic stripe reader. Such formats and the techniques associated with them are well known in the art. Accordingly, an initializing section 22 occupies the leading edge of the stripe 18 (left as illustrated).

Following the initializing section 22, the lower portion of the stripe 18 records clock pulses CS in a track 24 while the upper portion records data in a track 26. The use of recorded clock pulses to synchronize and control data flow is well known in the art.

An initial portion 28 of the data track 26 carries miscellaneous statistical data DS. Such data may take a variety of forms, as information of general or supplemental interest regarding the card C as a document. The magnetically recorded statistical data DS may be redundant, including the name of the assigned holder of the card, his birthdate, his account number, and any of a variety of other information.

Following the portion 28 of the magnetic stripe 18, a portion 30 records encrypted data CW which is derived from and is reconstructable to manifest component data including: address data AL (specifying locations D1, D2, D3, and D4), counterfeit characteristic data CC, and critical statistical data SD.

Commenting on the data signals, the uniqueness characteristic data CC actually manifests the signal levels (scale of ten) sensed at the locations D1, D2, D3, and D4 indicated on the card C. The critical statistical data SD represents the birthdate "12-07-52" of the assigned card holder as indicated by the printing 16 (FIG. 1). The data CC and SD are designated by prime marks, e.g. CC' and SD' when sensed later for comparison with data from the magnetic stripe, i.e. data CC and SD.

Preliminarily, consider an exemplary use of the card C by a holder presenting the card to establish that he has attained his maturity. The magnetic stripe would be sensed to provide encrypted signals CW. The signals CW would be de-encrypted to provide the address signals AL, the uniqueness characteristic signals CC, and the critical statistical data SD. The address signals AL designate the locations D1, D2, D3, and D4 which are sensed to provide freshly sensed signals CC'. Also, an optical reader senses the critical statistical data SD' representing the birthdate or it is provided by manual input. Test comparisons are then performed for the signals CC with CC' and SD with SD'. Favorable comparisons of the data sets indicate that: (1) the substance composition of the document is genuine and (2) the critical statistical data has not been modified. Such positive results would also verify the card to the extent that the critical statistical data from the card can be accepted with resonable certainty and used directly for machine processing.

The disclosed embodiment does not particularly treat the question of whether the person presenting the card C is its assigned holder. Of course, the photographic likeness 17 is helpful in that regard if the transaction is personally monitored. Alternatively, well known personal identification number techniques can be incorporated and used in conjunction with the disclosed embodiment.

In view of the above introductory explanations of the card C and its use, systems will now be considered for producing the card C and authenticating it in use. In that regard, reference initially will be made to FIG. 5 for an explanation of a structural system for completing the cards C in accordance with FIG. 1. The raw cards would be as physically represented in FIG. 1 bearing the print 16, the likeness 17, and the magnetic stripe 18; however, without the magnetic stripe recorded.

Preliminarily, it is helpful to recognize that signals from three sources are provided for recording the stripe 18. An independent input, e.g. terminal, provides the address data AL and the miscellaneous statistical data DS. The translucency of the card C is sensed at locations D1, D2, D3, and D4 to provide the signals CC. Finally, the printing 17 of the card C is sensed to provide the critical statistical data signals SD representative of the birthdate "12-07-52".

A card C (FIG. 5, lower right) is symbolically represented to be received by a card mechanism 44. Essentially, various units are well known in the prior art which include control elements and have the capability of transporting, sensing and otherwise manipulating a document as the card C. Details of such a mechanism are disclosed in the U. S. Pat. No. 4,423,415 referenced above. The card mechanism provides timing signals t, and directly involves other components as indicated by dashed lines 45. Specifically, the card mechanism 44 is integral with an optical reader 46, a terminal or data input device 47, a uniqueness characteristic sensor 48, and a magnetic recorder 49. These units sense and record the card C as it is passed through the mechanism 44. The optical reader 46 senses the critical statistical data SD, e.g. the date "12-07-52" from the card. The device 47 provides the address signals AL along with the miscellaneous statistical data DS. The sensor 48 provides the uniqueness characteristic signal CC. Processing and movements of these signals will now be considered.

Figure 5:
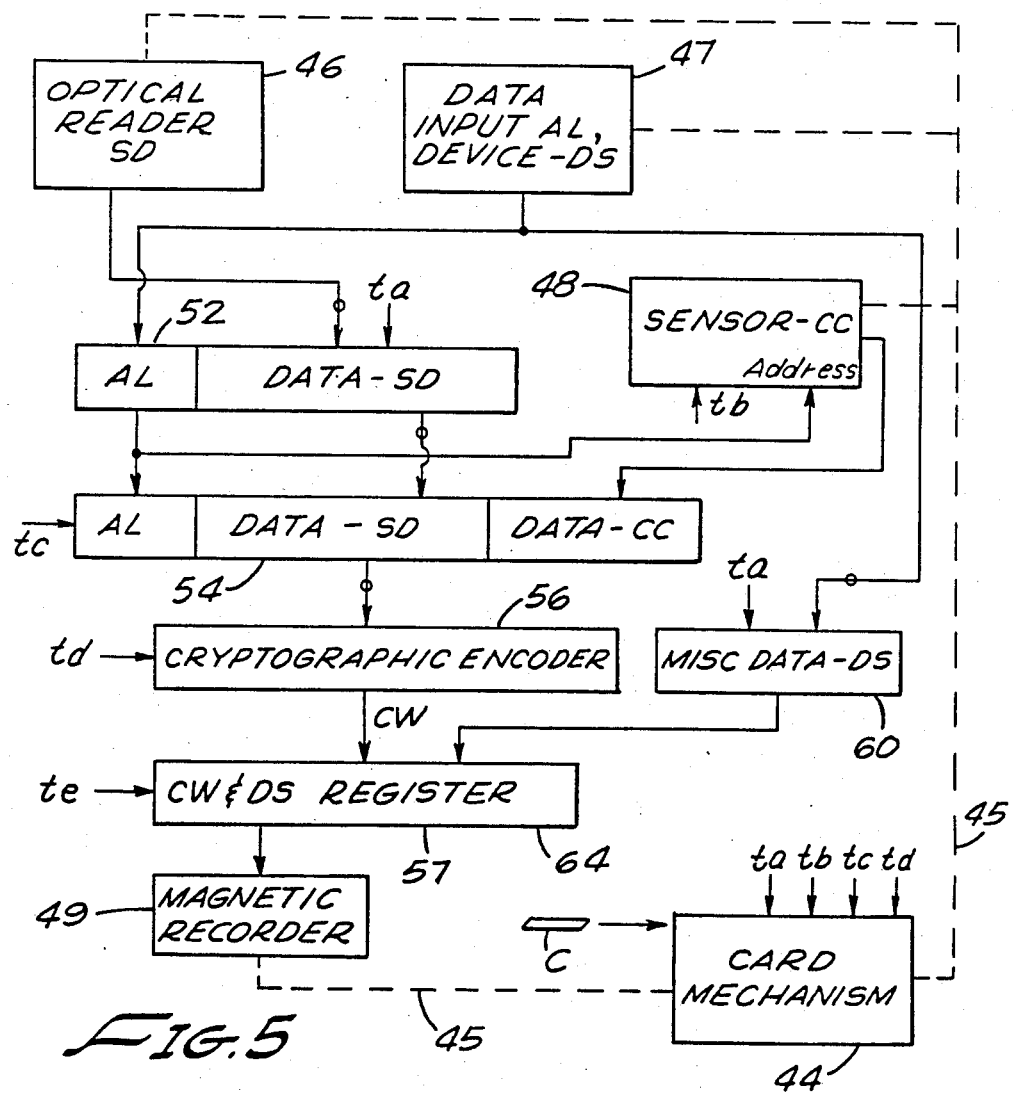
FIG. 5 is a block diagram of a document production system in accordance with the present invention.

The address signals AL from the device 47 are set in a register 52 along with the critical data signals SD from the reader 46 during a timing interval ta. From the register 52, the address signals AL are provided to the uniqueness characteristic sensor 48 which senses the card C at the locations D1, D2, D3, and D4 (FIG. 1) providing uniqueness characteristic signals CC in a digital format. The characteristic sensing operation is performed by the sensor 48 during the interval of timing signal tb with the resulting signals CC provided to a compiling register 54 during the timing signal tc as illustrated in FIG. 5. During the same interval tc, the address signal AL and the critical data signals SD are also received in the compiling register 54.

The data assembled in the register 54 (signals AL, SD, and CC) is supplied to a cryptographic encoder 56 where it is merged and encoded using any of a variety of encryption techniques to provide decodable, representative signals CW. In that regard, a variety of cryptographic encoders are well known in the prior art and may be employed in embodiments of the present invention. Thus, the crypotographic encoder 56 operates during the interval of the timing signal td and supplies the signal CW representative of the data AL, SD, and CC combined in a decodable format. From the encoder 56, the representative signals CW are supplied to a register 57 which also receives the miscellaneous data signals DS. The latter signals DS are provided to a register 60 (FIG. 5, center right) from the input device 47 during the timing interval ta. Accordingly, such signals are ready for movement to the register 57 during signal te along with the signals CW.

During the interval of timing signal tf, the contents of the register 64 is supplied to the magnetic recorder 49 for transducing the data (CW and DS) onto the magnetic stripe 18 (FIG. 1) of the card C. Accordingly, the card C (FIG. 1) is completed with the magnetic stripe 18 recorded in the format of FIG. 4. The card C may now be delivered to an assigned holder, i.e. one "John J. Jones", born "12-07-52" with the likeness 17 as depicted on the card C.

In use, the card C is authenticated by decoding the integrated encrypted data to provide separate component information for individual comparisons. Specifically, after decoding and separation, the anti-counterfeit or uniqueness information (data CC) is employed in a test to determine that the card is genuine. After decoding and separation, the critical statistical information (data SD) is employed in a test to verify that such information on the card has not been altered. A system for performing the authentication is illustrated in FIG. 6 and will now be considered.

To sense and validate a card C (upper left), it is placed in an authenticator holder or mechanism 68 which is associated with a magnetic reader 69, a sensor 70, and an optical reader 71 (dashed lines 67).

The mechanism 68 includes means for providing the timing signal ta-tx. In cooperation with the mechanism 68, the magnetic reader 69 transduces the magnetic stripe 18 (FIGS. 1 and 4) to provide signals representative of the miscellaneous statistical data DS and the encrypted data CW. The signals sensed by the magnetic reader 69 are provided to a register 72 during a timing interval indicated by a timing signal ta.

Signal representations from the register 72 comprising the encrypted data CW are applied to a cryptographic decoder 74 which functions during an interval of timing signal tb to develop the signal representations AL, SD, and CC which signals are placed in a register 76 during the interval of a timing signal tc. Note that the decrypted data actually consists of the address data AL, the critical statistical data DS, and the uniqueness character data CC.

Recapitulating, the contents of the magnetic stripe 18 (FIGS. 1 and 4) is sensed by the magnetic reader 69 to provide two separate data packages in the register 72, i.e. encrypted data CW and miscellaneous statistical data DS. The encrypted data CW is supplied to the cryptographic decoder 74 which operates to load the register 76 with the separated and decoded data. The miscellaneous data DS from the register 72 remains in that location for use as will be explained below.

The address data AL from the register 76 is applied to the sensor 70 (upper right) for controlling that apparatus to observe the card C for uniqueness data at the locations D1, D2, D3, and D4 (FIG. 1). Accordingly, fresh anti-counterfeiting, uniqueness character data CC' is sensed during signal td. Signals representative of the fresh uniqueness data CC' are applied to a comparator 78. Generally, the comparator 78 tests the freshly sensed uniqueness signals CC' with the previously recorded uniqueness signals CC (decoded from the encryption). The test serves to indicate the genuine substance of the card C.

The optical reader 71 senses the critical statistical data SD' providing representative signals to a comparator 79. Accordingly, in an action supplementary to confirming the genuine substance of the card, the statistical data signals are compared in the comparator 79 to verify the card content. Specifically, the optical reader 71 provides freshly sensed statistical data SD' for comparison during signal td with the originally sensed statistical data DS from register 76, e.g. the birthdate "12-07-52".

The comparators 78 (document genuine) and 79 (document content) provide approval output signals to an AND gate 81 which is also qualified by a timing signal te. On qualification, the occurence of a high signal from the AND gate 81 indicates that the card is genuine and has not been altered with respect to the critical data. That output is applied to a display unit 83 and to a recorder 84 incorporating data processing capability. The display unit 83 indicates the validity of the card C. The recorder 84 records the fact that the card was tested and approved on a particular date. Essentially, the recorder 84 may include any of a variety of forms of bulk storage, e.g. magnetic tape, along with a control system for recording entries. Specifically in the disclosed embodiment, the recorder 84 operates during a timing interval tf to record the critical data SD on approval and in a format indicating the date of the approval. Additionally, miscellaneous statistical data from the register 72 may be recorded to identify the card C, the bearer of the card, or both. The miscellaneous statistical data DS is also supplied from the register 72 to a display unit 85 for direct viewing. Output is also to a file by gates 89 and 91.

To enhance an appreciation of the system of the present invention, consider an exemplary operation involving specific use. Assume the existence of a card as illustrated in FIG. 1 assigned to one "John J. Jones" and further assume that the assigned bearer has presented the card to identify himself as a person who has attained his maturity, i.e. has reached the age of consent. Under the circumstances, assume that the card C is placed in the authenticator mechanism 68 (FIG. 6) for testing.

From the magnetic stripe 18, the system provides miscellaneous data signals DS to activate the unit 85 with the display "Jones". Thus, a further identifier is provided. Independently, the magnetic stripe data specifies the locations (D1, D2, D3, and D4) of the uniqueness data, the previously sensed values of such data, and the critical statistical data, "12-07-52". For comparison, the uniqueness data and the critical statistical data are freshly sensed by the sensor 70 and the reader 71. Thus, the decoded original statistical data SD is compared with the freshly sensed statistical data SD'. In a proper situation, both would manifest "12-07-52" verifying card content in that regard. In such a situation, the comparator 79 would partly qualify the AND gate 81.

The test for card substance authenticity involves the uniqueness signals CC (from the magnetic stripe) and CC' (freshly sensed). Those signals are applied to the comparator 78. In operation, the comparator 78 may be as set forth in the above-referenced U.S. Pat. No. 4,423,415. An adequate degree of comparison produces the high level of a binary signal to further qualify the AND gate 81. As a consequence, at timing interval te the gate 81 is qualified to activate the display unit 83 and the recorder 84. On activation, the display unit 83 manifests that the card is genuine and unaltered with respect to the critical statistical data. Accordingly, the user of the system simply observes the display 85 to confirm the assigned card holder's name and the display unit 83 to observe that the card is authentic. A reliable test is thus performed to verify the holder's age and his qualification to enter into a transaction requiring majority. To confirm the event of the test and the approval, the recorder 84 carries the statistical data if some question should develop at a future date. The recorder also may associate with other data processing apparatus that acts on the critical statistical data with the assurance that it has been verified. As illustrated, the system may be associated with processing apparatus incorporating a data file. Accordingly, the register 76 is coupled to an output line 93 through the AND gate 89. Similarly, the register 72 supplies statistical data through an AND gate 91 to an output line 95. The gates 89 and 91 are controlled by the approval signal from the gate 81 indicating that the card tests genuine and not altered. It may therefore be seen that upon testing an authentic document, data from the document is captured for direct entry into a data file.

From the above descriptions, it may be appreciated that a system is disclosed for reliably verifying the genuine substance of a document and its content, e.g. that the document has not been altered with regard to critical data. Various forms of the system may well be adapted to process a wide variety of different documents. For example, the system may be adapted for use with financial paper which may be sensed by machine and if tested as genuine the resulting data may be processed with a good degree of reliability. Of course, various other forms of the system may be implemented and used as will be apparent from the above description. Accordingly, the scope hereof is deemed as set forth in the claims below.

What is claimed is:

1. A processor for a document or the like bearing critical statistical data, said document having a machine-readable anticounterfeit characteristic and a machine-readable coded format including reference representations of said anticounterfeit characteristic, said processor comprising:

means for sensing said anticounterfeit characteristic from said document to provide first signals representative of said anticounterfeit characteristic;

means for reading said coded format to provide encoded signals;

means for decoding said encoded signals to provide second signals representative of said anticounterfeit characteristic and said critical statistical data;

means for comparing at least portions of said first and second signals representative of said anticounterfeit characteristic to provide signals indicative of the authenticity of said document; and means for supplying said critical statistical data for processing, the operation thereof being conditioned by said signals indicative of the authenticity of said document.

2. A processor according to claim 1 wherein said means for comparing further receives reference critical statistical data signals and includes means to compare said reference signals with said second signals.

3. A processor according to claim 2 wherein said means for providing said reference critical statistical signals includes means for reading critical statistical data from said card.

4. A processor for a document or the like having an anticounterfeit characteristic and a machine-readable format representative of critical statistical data, said processor for use with a data file and comprising:

means for sensing said anticounterfeit characteristic from said document to provide sensed signals representative of said anticounterfeit characteristic;

means for sensing said document for providing sensed signals representative of said critical statistical data;

means for independently providing combination signals representative of said anticounterfeit characteristic and said critical statistical data;

means for comparing at least portions of said sensed signals representative of said anticounterfeit characteristic and at least portions of said sensed signals representative of said statistical data with said combination signals to provide signals indicative of the authenticity of said document substance and content;

means adapted to be connected to said data file controlled by said signals indicative of the authenticity of said document substance and content.

5. A processor according to claim 4 wherein said means for comparing includes cryptographic decoder means for decoding said combination signals.

6. A processor according to claim 4 wherein said means for providing combination signals comprises means for sensing a record on said document.

7. A processor according to claim 6 wherein said means for sensing a record comprises magnetic sensing means.

8. A processor according to claim 4 wherein said means for sensing said document for providing signals representative of critical statistical data comprises an optical reader.

9. An authenticator device for human perception and further capable of machine use with respect to substantially unique verifiable identification and informational content comprising:

a sheet of medium defining a form for said authenticator device and having a machine-readable anticounterfeit characteristic for verifying the identification of said sheet;

a printed format on said sheet of medium representative of critical statistical data and in human-readable form;

a machine-readable record on said sheet of medium including encoded data comprising said anticounterfeit characteristic and said critical statistical data in combination for enabling comparison at least in part to verify said anticounterfeit characteristic.

10. An authenticator according to claim 9 wherein said machine-readable record carries said anticounterfeit and said critical statistical data in encrypted form.

11. An authenticator according to claim 9 wherein said anticounterfeit characteristic comprises an inherent characteristic of said medium.

12. An authenticator according to claim 9 wherein said anticounterfeit characteristic comprises a translucency characteristic of said medium.

13. An authenticator according to claim 9 wherein said machine-readable record comprises a magnetic material.

14. A system for producing an authenticator device from a sheet or the like having an anticounterfeit characteristic and for carrying statistical data to be processed independently of said authenticator, said system comprising:

means for sensing said anticounterfeit characteristic from said sheet to provide sensed anticounterfeit signals representative of said anticounterfeit characteristic;

means for providing signals representative of critical statistical data for said authenticator; and means for recording said sensed anticounterfeit signals in a combined form with said signals representative of statistical data on said sheet in machine-readable form.

15. A system according to claim 14 wherein said means for recording comprises a magnetic recording means.

16. A system according to claim 14 wherein said means for recording comprises means for recording data in a humanly perceivable form and a machine-readable form.

17. A system according to claim 14 further including a cryptographic encoder for encoding certain of said signals in a combined form prior to recording.

* * * * *